(12) United States Patent
Broers et al.

(10) Patent No.: US 10,531,539 B2
(45) Date of Patent: Jan. 7, 2020

(54) METHOD FOR CHARACTERIZING ILLUMINATION OF A TARGET SURFACE

(71) Applicant: SIGNIFY HOLDING B.V., Eindhoven (NL)

(72) Inventors: Harry Broers, 'S-Hertogenbosch (NL); Ruben Rajagopalan, Neuss (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/081,166

(22) PCT Filed: Feb. 23, 2017

(86) PCT No.: PCT/EP2017/054193
§ 371 (c)(1),
(2) Date: Aug. 30, 2018

(87) PCT Pub. No.: WO2017/148793
PCT Pub. Date: Sep. 8, 2017

(65) Prior Publication Data
US 2019/0098729 A1    Mar. 28, 2019

Related U.S. Application Data

(60) Provisional application No. 62/302,471, filed on Mar. 2, 2016.

(30) Foreign Application Priority Data

Apr. 15, 2016    (EP) .................................... 16165472

(51) Int. Cl.
| | | |
|---|---|---|
| H05B 37/02 | (2006.01) | |
| F21V 23/04 | (2006.01) | |
| F21S 8/00 | (2006.01) | |

(52) U.S. Cl.
CPC .......... *H05B 37/0227* (2013.01); *F21S 8/036* (2013.01); *F21V 23/0478* (2013.01); *H05B 37/029* (2013.01); *H05B 37/0218* (2013.01)

(58) Field of Classification Search
CPC ............ H05B 37/0227; H05B 37/0218; H05B 37/029; F21S 8/036; F21V 23/0478
(Continued)

(56) References Cited

U.S. PATENT DOCUMENTS

| | | | |
|---|---|---|---|
| 2013/0300290 A1 | 11/2013 | Holland et al. | |
| 2014/0339985 A1* | 11/2014 | Engelen ................ | G06F 3/0421 |
| | | | 315/151 |

FOREIGN PATENT DOCUMENTS

| | | |
|---|---|---|
| DE | 102013012231 A1 | 1/2015 |
| WO | 2009059464 A1 | 5/2009 |

(Continued)

*Primary Examiner* — Daniel D Chang
(74) *Attorney, Agent, or Firm* — Meenakshy Chakravorty (57) ABSTRACT

A method (300) for measuring illumination by a lighting unit (10) of a target surface (50) within a lighting environment (100) includes the steps of: illuminating (320), with a light source (12) of the lighting unit, the target surface; detecting (330), with a light sensor (32), a light intensity for a plurality of locations of the target surface; detecting (340) parameter of the lighting environment; selecting (350), by a controller of the lighting unit, a subset of the plurality of light intensities based on the detected parameter of the lighting environment; and estimating (360), using the selected subset of light intensities, a lux of the target surface.

14 Claims, 3 Drawing Sheets

(58) Field of Classification Search
USPC .......................................................... 315/312
See application file for complete search history.

(56) References Cited

FOREIGN PATENT DOCUMENTS

| | | |
|---|---|---|
| WO | 2012137046 A1 | 10/2012 |
| WO | 2013072815 A1 | 5/2013 |
| WO | 2013088312 A1 | 6/2013 |
| WO | 2013093771 A1 | 6/2013 |
| WO | 2013179175 A1 | 12/2013 |
| WO | 2015128192 A1 | 9/2015 |
| WO | 2015128760 A1 | 9/2015 |
| WO | 2015139971 A1 | 9/2015 |
| WO | 2015168127 A1 | 11/2015 |

* cited by examiner

METHOD FOR CHARACTERIZING ILLUMINATION OF A TARGET SURFACE

CROSS-REFERENCE TO PRIOR APPLICATIONS

This application is the U.S. National Phase application under 35 U.S.C. § 371 of International Application No. PCT/EP2017/054193, filed on Feb. 23, 2017, which claims the benefit of European Patent Application No. 16165472.8, filed on Apr. 15, 2016 and U.S. Patent Application No. 62/302,471, filed on Mar. 2, 2016. These applications are hereby incorporated by reference herein.

FIELD OF THE INVENTION

The present disclosure is directed generally to methods and systems for characterizing the illumination of a target surface within a lighting environment.

BACKGROUND

Sensor-driven lighting units monitor a characteristic of the environment with a sensor and utilize the sensor data to control the light source of the lighting unit. The most common example of sensor-driven lighting units are systems that monitor light levels using integrated photocells that measure ambient light levels. For example, night lights use ambient light to turn on when ambient light levels decrease and to turn off when ambient light levels increase. Similarly, smart street lighting uses detected ambient light to determine when to turn the light source on and off. Most often, the light level is monitored by a photocell directed towards the sky to observe the ambient light conditions. In which direction the photocell is directed, or which surface or area is utilized for light level monitoring, is driven primarily by product design. In most devices there is no relationship between the surface or area from which the ambient light level is monitored and the target surface to be illuminated.

Additionally, the photocell or photocells utilized in traditional sensor-driven lighting units cannot provide a spatial light distribution of an illuminated target surface. These systems, therefore, integrate all incoming detected light into a single value. As a result, the lighting unit can be adversely affected by light reflected from obstructions such as tree tops, objects moving through the light beam, and other physical obstacles that can, for example, cast shadows on or near the target surface. Accordingly, traditional sensor-driven lighting units provide sub-optimal light level monitoring, thereby resulting in poor system performance.

Accordingly, there is a continued need in the art for methods and systems that measure and characterize the illumination of a target surface within a lighting environment, in order to provide a more accurate light profile.

SUMMARY OF THE INVENTION

The present disclosure is directed to inventive methods and apparatus for measuring illumination of a target surface within a lighting environment. Various embodiments and implementations herein are directed to a lighting unit with a light meter that measures light intensity for multiple portions of the target surface. Another sensor, such as a camera, a time-of-flight camera, a multispectral imager, an occupancy sensor, a thermal imager, and/or a microphone, is utilized to characterize one or more parameters of the lighting environment. The lighting unit then selects a subset of the measured light intensity based on the characterized lighting environment, and utilizes that information to estimate a more accurate lux of the target surface. This eliminates shadows, obstructions, occupants, and other elements within the lighting environment that can affect the light profile. Further, the lighting unit can then utilize the more accurate lux estimate to adjust one or more characteristics of the light emitted by a light source of the lighting unit.

Generally, in one aspect, a method for measuring illumination by a lighting unit of a target surface within a lighting environment includes the steps of: illuminating, with a light source of the lighting unit, the target surface; detecting, with a light sensor, a light intensity for a plurality of locations of the target surface; detecting a parameter of the lighting environment; selecting, by a controller of the lighting unit, a subset of the plurality of light intensities based on the detected parameter of the lighting environment; and estimating, using the selected subset of light intensities, a lux of the target surface.

According to an embodiment, the parameter of the lighting environment is detected with a second sensor.

According to an embodiment, the detected parameter is a distance between the light source and a reflecting surface.

According to an embodiment, the detected parameter is a two-dimensional image of at least a portion of the lighting environment.

According to an embodiment, the detected parameter is a multispectral image of at least a portion of the lighting environment.

According to an embodiment, the detected parameter is a three-dimensional image of at least a portion of the lighting environment.

According to an embodiment, the method includes the step of detecting, using the detected parameter, an obstruction situated in the lighting environment between the light source and the target surface, the controller configured to select the subset of the plurality of light intensities.

According to an embodiment, the method further includes the step of adjusting a parameter of the lighting unit based on the estimated lux of the target surface.

According to an embodiment, the detected parameter is an occupant within the lighting environment, the controller configured to select the subset of the plurality of light intensities based at least in part on information about the detected occupant.

According to an embodiment, the detected parameter is a thermogram of at least a portion of the lighting environment.

According to an embodiment, the detected parameter is a sound within the lighting environment.

Generally, in another aspect, a lighting unit configured to illuminate a target surface within a lighting environment includes: a light source; a light sensor configured to detect a light intensity for a plurality of locations of the target surface; a sensor configured to detect a parameter of the lighting environment; and a controller configured to select a subset of the plurality of light intensities based on the detected parameter of the lighting environment and determine, using the selected subset of light intensities, a lux of the target surface.

Generally, in another aspect, a lighting system configured to illuminate a target surface within a lighting environment includes: a lighting unit comprising a light source and a controller; a light sensor configured to detect a light intensity for a plurality of locations of the target surface; and a sensor configured to detect a parameter of the lighting environment; where the controller is configured to select a subset of the plurality of light intensities based on the detected parameter of the lighting environment and estimate, using the selected subset of light intensities, a lux of the target surface.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semiconductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a lighting unit configured to more accurate estimate the lux of an illuminated target surface. More generally, Applicant has recognized and appreciated that it would be beneficial to provide a lighting unit, fixture, or system that measures light intensities of the target surface and measures another characteristic of the lighting environment, such as an obstruction, a shadow, the presence of an occupant, and other elements of the lighting environment. A particular goal of utilization of certain embodiments of the present disclosure is select the light intensities from an unobstructed portion of a target surface in order to create a more accurate lux of the target surface.

In view of the foregoing, various embodiments and implementations are directed to a lighting unit or system with a light meter that measures light intensity for multiple portions of the target surface. Another sensor, such as a camera capable of taking two-dimensional and/or three-dimensional images, a time-of-flight camera, a multispectral imager, an occupancy sensor, a thermal imager, and/or a microphone, is utilized to characterize one or more parameters of the lighting environment. The lighting unit then selects a subset of the measured light intensity based on the characterized lighting environment, and utilizes that information to estimate a more accurate lux of the target surface.

Figure 1:
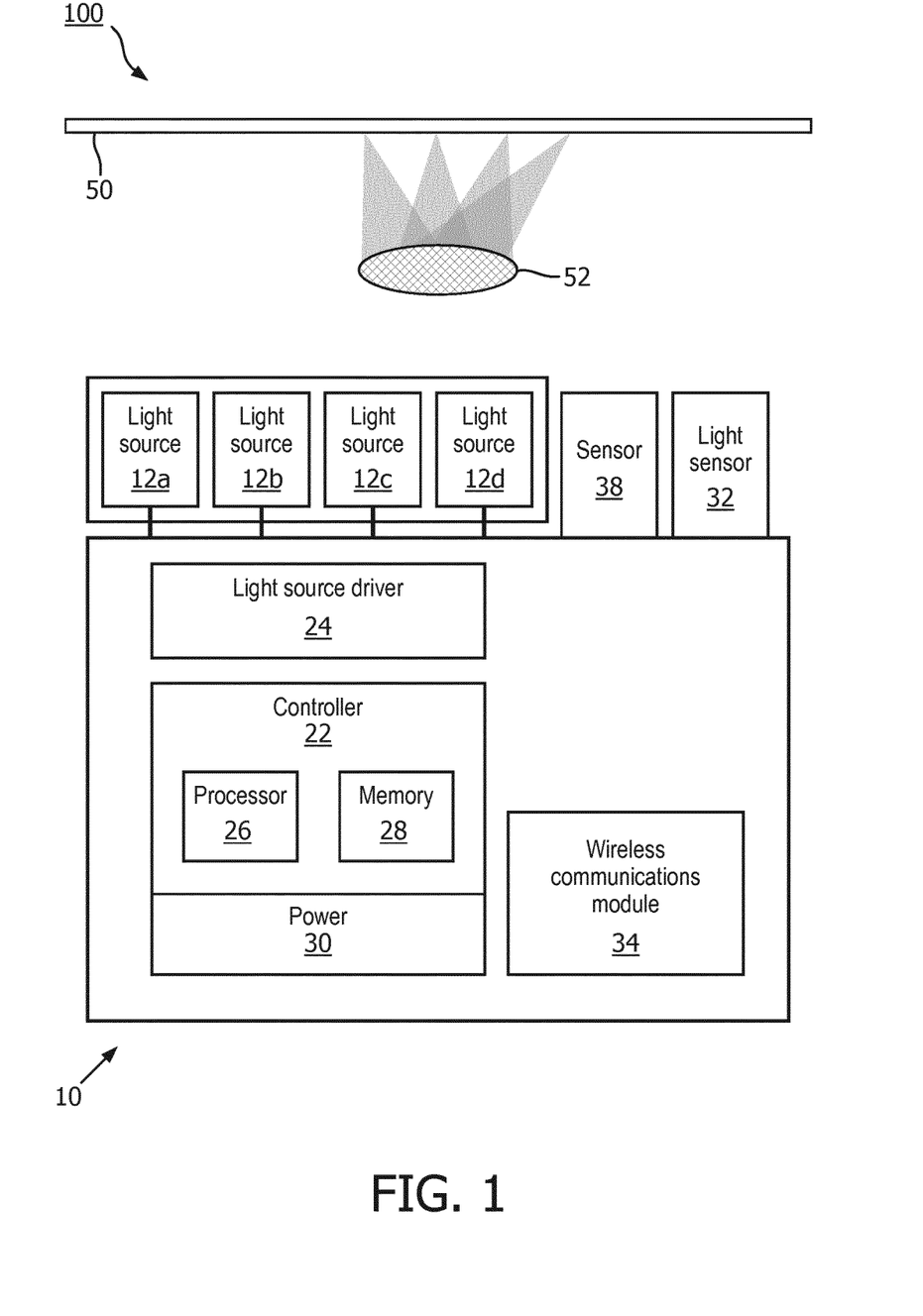
FIG. 1 is a schematic representation of a lighting unit, in accordance with an embodiment.

Referring to FIG. 1, in one embodiment, a lighting unit 10 is provided that includes one or more light sources 12, where one or more of the light sources may be an LED-based light source. Further, the LED-based light source may have one or more LEDs. The light source can be driven to emit light of predetermined character (i.e., color intensity, color temperature) by one or more light source drivers 24. Many different numbers and various types of light sources (all LED-based light sources, LED-based and non-LED-based light sources alone or in combination, etc.) adapted to generate radiation of a variety of different colors may be employed in the lighting unit 10. According to an embodiment, lighting unit 10 can be any type of lighting fixture, including but not limited to a night light, a street light, a table lamp, or any other interior or exterior lighting fixture.

According to an embodiment, lighting unit 10 includes a controller 22 that configured or programmed to output one or more signals to drive the one or more light sources 12a-d and generate varying intensities, directions, and/or colors of light from the light sources. For example, controller 22 may be programmed or configured to generate a control signal for each light source to independently control the intensity and/or color of light generated by each light source, to control groups of light sources, or to control all light sources together. According to another aspect, the controller 22 may control other dedicated circuitry such as light source driver 24 which in turn controls the light sources so as to vary their intensities. Controller 22 can be or have, for example, a processor 26 programmed using software to perform various functions discussed herein, and can be utilized in combination with a memory 28. Memory 28 can store data, including one or more lighting commands or software programs for execution by processor 26, as well as various types of data including but not limited to specific identifiers for that lighting unit. For example, the memory 28 may be a non-transitory computer readable storage medium that includes a set of instructions that are executable by processor 26, and which cause the system to execute one or more of the steps of the methods described herein.

Controller 22 can be programmed, structured and/or configured to cause light source driver 24 to regulate the intensity and/or color temperature of light source 12 based on predetermined data, such as ambient light conditions, among others, as will be explained in greater detail hereinafter. According to one embodiment, controller 22 can also be programmed, structured and/or configured to cause light source driver 24 to regulate the intensity and/or color temperature of light source 12 based on communications received by a wireless communications module 34.

Lighting unit 10 also includes a source of power 30, most typically AC power, although other power sources are possible including DC power sources, solar-based power sources, or mechanical-based power sources, among others. The power source may be in operable communication with a power source converter that converts power received from an external power source to a form that is usable by the lighting unit. In order to provide power to the various components of lighting unit 10, it can also include an AC/DC converter (e.g., rectifying circuit) that receives AC power from an external AC power source 30 and converts it into direct current for purposes of powering the light unit's components. Additionally, lighting unit 10 can include an energy storage device, such as a rechargeable battery or capacitor, that is recharged via a connection to the AC/DC converter and can provide power to controller 22 and light source driver 24 when the circuit to AC power source 30 is opened.

In addition, lighting unit 10 can include a light sensor 32, such as a light meter, that is connected to an input of controller 22 and collects ambient light data in the vicinity of lighting unit 10 and can transmit data to controller 22, or externally via wireless communications module 34, that is representative of the ambient light data it collects. In some embodiments such as system 200 depicted in FIG. 2, sensor 32 is remote from the lighting unit 10 and transmits obtained sensor data to wireless communications module 34 of the lighting unit. The wireless communications module 34 can be, for example, Wi-Fi, Bluetooth, IR, radio, or near field communication that is positioned in communication with controller 22 or, alternatively, controller 22 can be integrated with the wireless communications module.

According to an embodiment, lighting unit 10 includes a second sensor 38, such as such as a camera capable of taking two-dimensional and/or three-dimensional images, a time-of-flight camera, a multispectral imager, an occupancy sensor, a thermal imager, a radio frequency sensor, and/or a microphone, among other sensors. Sensor 38 is connected to an input of controller 22 and collects information about a target surface 50 within a lighting environment 100 and can transmit data to controller 22, or externally via wireless communications module 34, that is representative of the collected information. In some embodiments such as system 200 depicted in FIG. 2, sensor 38 is remote from the lighting unit 10 and transmits obtained sensor data to wireless communications module 34 of the lighting unit. The wireless communications module 34 can be, for example, Wi-Fi, Bluetooth, IR, radio, or near field communication that is positioned in communication with controller 22 or, alternatively, controller 22 can be integrated with the wireless communications module.

According to an embodiment, the first sensor 32 and second sensor 38 are spatially positioned with respect to each other such that the two sensors can achieve one or more operational goals. This ensures that the region within the lighting environment for which the second sensor 38 obtains information is co-localized or co-extensive with the light meter's spatial observation window. For example, the if the second sensor is a time-of-flight camera, then the time-of-flight camera must be oriented to obtain information about the same region, area, or surface within the lighting environment for which the light meter is obtaining information.

Although first sensor 32 and second sensor 38 are depicted in FIG. 1 as separate sensors, one of skill in the art would recognize that there could be a single sensor that performs both sensing functions. According to an embodiment, first sensor 32 and second sensor 38 are just one camera, or a single time-of-flight camera. In this embodiment, the camera would be configured to perform the light intensity detection while simultaneously and/or sequentially collecting information about the target surface within the lighting environment.

Additionally, one of skill in the art will recognize that a sensor can comprise one or more data collection units. Either of first sensor 32 and second sensor 38, or a single sensor if the functions of first sensor 32 and second sensor 38 are performed by one sensor, can comprise one or more data collection units. As one example, first sensor 32 can comprise two or more a light meters. As another example, second sensor 38 can comprise two or more cameras, two or more time-of-flight cameras, two or more multispectral imagers, two or more occupancy sensors, two or more thermal imagers, and/or two or more microphones, among other sensors. Additionally, the sensors can comprise a combination of two or more sensors, such as a camera, a microphone, and a passive infrared sensor. The combined sensors can be a single unit or can be multiple units in communication with a processor of the lighting unit 10. As just one example, a microphone sensor may comprise an array of two or more microphones in order to enable fine spatial alignment with detected noise.

Figure 2:
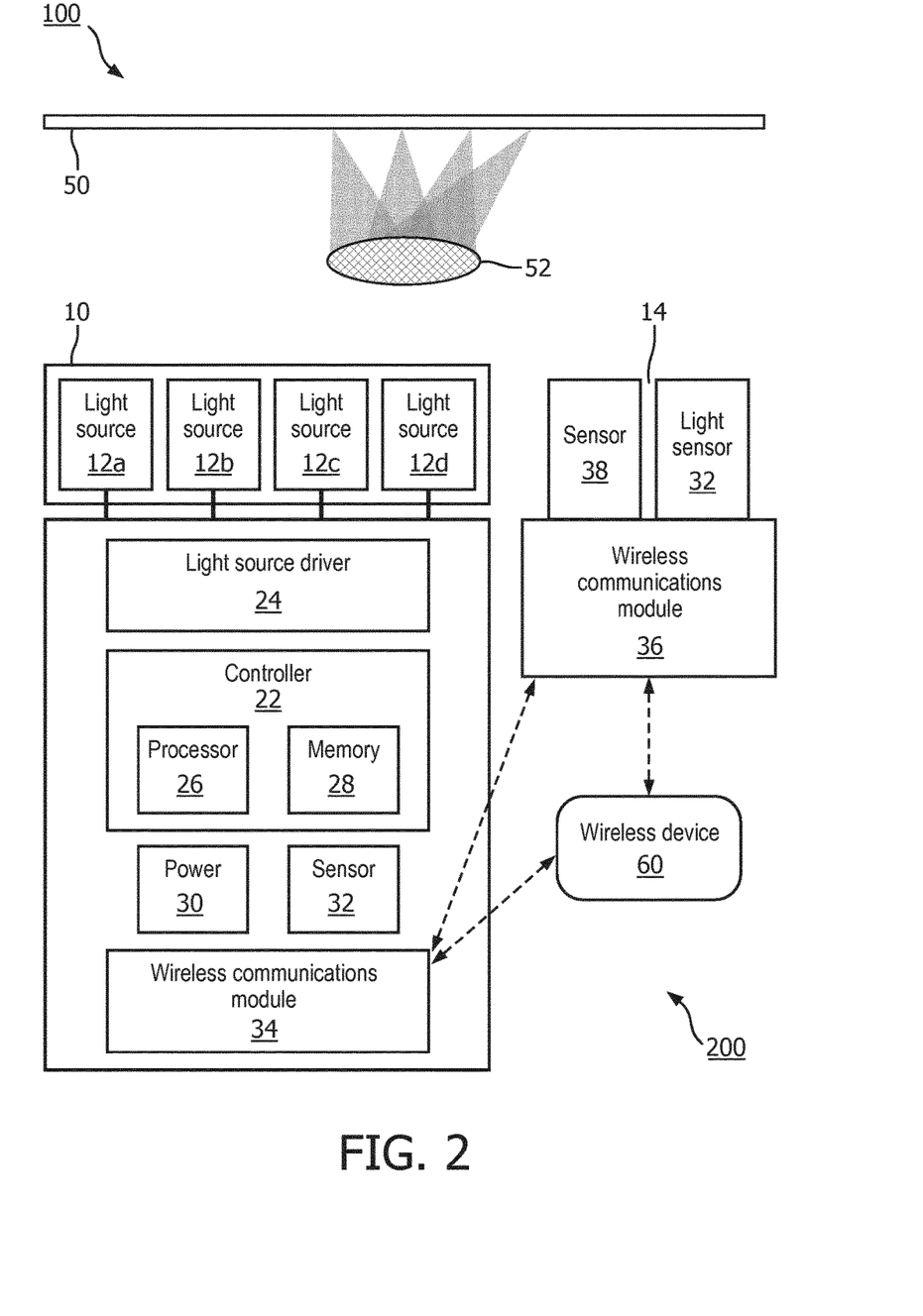
FIG. 2 is a schematic representation of a lighting system, in accordance with an embodiment.

Referring to FIG. 2, in one embodiment, a lighting system 200 is provided that includes a lighting unit 10. Lighting unit 10 can be any of the embodiments described herein or otherwise envisioned, and can include any of the components of the lighting units described in conjunction with FIG. 1, such as one or more light sources 12, light source driver 24, controller 22, and wireless communications module 34, among other elements. Lighting system 200 also includes a detection component 14 which includes sensor 32, sensor 38, and wireless communications module 36, among other elements. Wireless communications modules 34 and 36 can be, for example, Wi-Fi, Bluetooth, IR, or near field communication that is positioned in communication with each other and/or with a wireless device 60, which can be, for example, a network, a computer, a server, or a handheld computing device, among other wireless devices.

Figure 3:
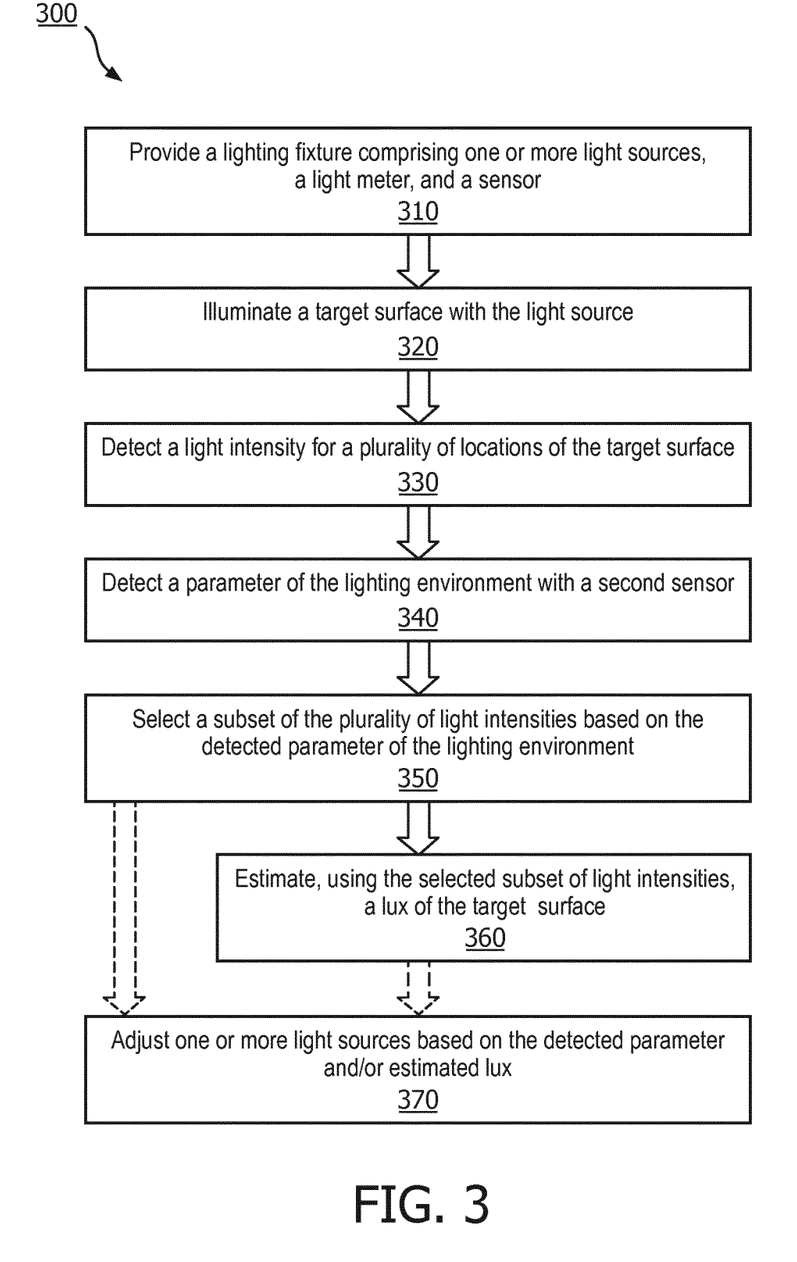
FIG. 3 is a flow chart of a method for measuring illumination of a target surface within a lighting environment, in accordance with an embodiment.

Referring to FIG. 3, in one embodiment, a flow chart illustrating a method 300 for measuring the illumination of a target surface within a lighting environment, in accordance with an embodiment. In step 310, a lighting unit 10 is provided. Lighting unit 10 can be any of the embodiments described herein or otherwise envisioned, and can include any of the components of the lighting units described in conjunction with FIGS. 1 and 2, such as one or more light sources 12, light source driver 24, controller 22, light sensor 32, sensor 38, and wireless communications module 34, among other elements. According to an embodiment, lighting unit 10 is configured to illuminate all or a portion of a target surface 50.

At step 320 of the method, the lighting unit illuminates all or a portion of the target surface 50. According to one embodiment, the lighting unit is a street fixture or other external lighting fixture and is configured to illuminate a target surface such as a street or sidewalk. The street light may be configured, for example, to illuminate a street or sidewalk between dusk and dawn. Thus, light sensor 32 or some other sensor, for example, can detect ambient light levels and based on a predetermined threshold can activate and deactivate the light sources.

At step 330 of the method, the light sensor 32 detects a light intensity for a number of different locations within the target surface 50 and/or within the lighting environment 100. The light sensor can be, for example, any light sensor capable of measuring light intensities. The light sensor communicates the light intensity information to the controller 22, where the information can be analyzed and/or can be stored within memory 28. According to one embodiment, the light sensor obtains sensor data continuously. According to another embodiment, the light sensor obtains sensor data periodically, such as one every minute or multiple times per minute, among many other periods of time.

At step 340 of the method the lighting unit detects, with the second sensor 38, a parameter of the lighting environment. According to an embodiment, a lighting environment can comprise one or more obstructions 52 or other bodies, structures, or elements that can affect the light profile created by the one or more light sources of the lighting unit. For example, in FIGS. 1 and 2, the lighting environment comprises an obstruction 52 located between the light sources and the target surface in the path of the light, which results in a shadow on the target surface. If the light sensor detects these shadows and the controller considers the shadowed region of the target surface when estimating the lux of the target surface and/or lighting environment, the lux estimate will be negatively affected. For example, the system may determine that the light profile is too dim because the average lux is lowered by the shadows.

According to another embodiment, second sensor 38 is a time-of-flight camera. The time-of-flight sensor or camera receives reflected light from the lighting environment, and measures the phase between the light transmitted by the light sources of the lighting unit, and the received light. The sensor or controller can then use plane-fitting or another analysis method to determine the free space between the sensor and the target surface. According to an embodiment, accuracy of the phase measurement and the range data depends on the illumination intensity and reflectivity of objects or surfaces within the lighting environment. Additionally, the sensor is also able to detect the near infrared spectrum emitted by the sun. In the example of a street light with both target and non-target surfaces within the lighting environment, the time-of-flight sensor will detect different optical properties and thus different distances between the target and non-target surfaces. The lighting unit or lighting system can utilize the time-of-flight sensor data to detect an obstruction that is permanently or temporarily situated between the lighting unit and the target surface, such as a tree, a person, or other objects. According to one embodiment, the time-of-flight sensor can also be utilized to monitor the height of the lighting unit from the target surface, thereby detecting changes in the height and orientation of the lighting unit such as movement during a storm or in the case of a streetlight, situations where the light and/or its support structure has fallen to the ground.

According to an embodiment, second sensor 38 is a multispectral imager. A multispectral imager captures image data at two or more specific frequencies across the electromagnetic spectrum. The multispectral imager can separate wavelengths with one or more filters, or can use two or more sensors each sensitive to a different wavelength or wavelengths. In the example of a streetlight or an external lighting fixture, the multispectral imager obtains a multispectral image of the lighting environment, which could include both target and non-target surfaces. The multispectral image can be analyzed to identify, for example, a region or regions within the image that are the target surface and the region or regions, if any, that are the non-target surface.

According to one embodiment, second sensor 38 is a thermal imager. The thermal imager captures a thermal image, or thermogram, of one or more locations within the lighting environment, and the image is utilized by the lighting unit or system to determine environmental conditions. For example, objects such as individuals and electronic devices will have a thermal signature that allows them to be identified within the thermal image. In a lighting environment with natural light, the thermal image can be utilized to detect regions of heat caused by sunlight. Other activity or objects within a lighting environment can similarly be identified and/or characterized.

According to another embodiment, second sensor 38 is an occupancy sensor. Occupancy sensors typically detect occupants using an infrared sensor, an ultrasonic sensor, and/or a microwave sensor. Using either current occupancy or an occupancy map created over time, the lighting unit or system can identify regions within a lighting environment that are affected by occupants as well as regions that are never or seldom affected by occupants.

According to one embodiment, second sensor 38 is a radio frequency sensor. Among many other possibilities, the radio frequency sensor could determine the presence of, and triangulate the location of, one or more mobile devices to reject pixels in the region of the localized mobile device. Many other options are possible.

According to yet another embodiment, second sensor 38 is a microphone. The microphone can obtain sound data that informs the system that an individual or other object is present within the lighting environment. A microphone array of two or more microphones could also be utilized to approximate the location of the individual or object within the lighting environment. As one embodiment, a room or space experiencing noise levels above a certain level, such as 50 dB for example, would indicate occupancy and/or activity in the room or space. Accordingly, the system could then execute a predetermined course of action such as temporarily suspending light intensity measurement in that space, among many other possible actions described or otherwise envisioned herein.

At step 350 of the method, the lighting unit selects a subset of the plurality of light intensities based on the detected parameter of the lighting environment. As one embodiment, the lighting unit or system analyzes the data from the second sensor to determine a preferred target region and directs the controller to utilize only light sensor data from that region for further analysis. As another example, the lighting unit can analyze the data from the second sensor to determine a target region that is suitable for obtaining intensity data, and can direct the light sensor to obtain information about just the identified target region.

According to an embodiment where second sensor 38 is a camera, the image data obtained by the camera can be analyzed to determine the spatial light distribution within the lighting environment. For example, the data can be utilized to determine the target surface—such as a roadway or sidewalk—and non-target surface—such as grass, a tree, a person, a shadow, or some other surface or object—within the lighting environment. The target region can be selected manually by reviewing the camera image and determining from the image the region to be monitored, or the target region can be selected by the controller of the lighting unit or system.

For example, the two-dimensional or three-dimensional image obtained by the camera or other imager can be analyzed or processed to display, convey, or represent a visual representation of the imaged scene. Alternatively, the image obtained by the camera or other imager can be analyzed or processed to display, convey, or represent a more image-specific information, such as specific intensities of one or more surfaces or objects in the image. The intensities analyzed or depicted could be any part of the light spectrum, ranging from ultraviolet to visible to infrared to near-infrared to far-infrared.

According to an embodiment where second sensor 38 is a time-of-flight sensor, the sensor data can be analyzed to detect a region within the lighting environment where there are no obstructions between the sensor and the target surface. Using a streetlight as an example, the controller of the lighting unit or system can determine where there are obstructions such as branches of a tree, pedestrians, or cars, and can determine a region or regions within the lighting environment that are not affected by the obstruction and thus can be utilized for more accurately estimating the lux of the target surface.

According to an embodiment where second sensor 38 is a multispectral imager, the sensor data can be analyzed to identify, for example, a region or regions within the image that are the target surface and the region or regions, if any, that are the non-target surface, which will have different optical properties.

According to an embodiment where second sensor 38 is a thermal imager, the sensor data can be analyzed to detect regions within the lighting environment that have high thermal readings such as people, electronic devices, and surfaces receiving sunlight, among other regions or objects. The controller of the lighting unit or system will identify these non-target regions with a high thermal reading and will either only utilize light sensor data from areas other than the identified non-target regions, or will direct the light sensor to obtain only sensor data from areas other than the identified non-target regions.

According to an embodiment where second sensor 38 is an occupancy sensor or occupancy map created from occupancy sensor data, the occupancy information or map can be utilized to detect regions within the lighting environment that are affected by occupants and/or regions within the lighting environment that are unaffected by occupants. The controller of the lighting unit or system will identify regions that are not affected by occupants and will either utilize only light sensor data from these identified regions, or will direct the light sensor to obtain only sensor data from these identified regions.

According to an embodiment where second sensor 38 is microphone, the microphone can determine occupancy or can determine the location of an individual or other object within the lighting environment. Using this information, the controller of the lighting unit or system will identify target regions for intensity analysis.

At step 360, the lighting unit controller estimates, using the selected subset of light intensities, the illuminance or lux of the target surface. The selected subset of light intensities can be, for example, obtained by the light sensor after a suitable, unobstructed or low-thermal region has been selected for light intensity analysis, or can be isolated from an existing set of light intensities. For example, in an example where the lighting unit is a streetlight and a camera has detected an unobstructed portion or a sidewalk as the target surface, the controller can determine lux only using the pixels in an image that are within the target surface. According to another embodiment, the controller directs the light sensor to obtain new intensities only from the identified target region. The illuminance of the identified target surface can be estimated using any of a number of methods. The illuminance can be determined by selecting one or more pixels or regions within the identified target surface, or can be determined by averaging the measured intensities for multiple pixels or regions within the identified target surface. According to an embodiment, the system estimates lux for the target surface and/or applies the lux estimate of the identified target surface for the entire lighting environment.

At optional step 370 of the method, the controller utilizes the obtained lux information to adjust or otherwise adapt the light profile emitted by the lighting unit or system. According to an embodiment, the controller can adjust the beam width, angle, and/or intensity of one or more light sources. For example, the controller can adjust one or more light sources to remove a shadow detected within the lighting environment. The information could also be utilized to control the sensitivity and/or performance of one or more other sensors in order to reduce the effect of false triggers. Similarly, the information could be utilized to change a feature, parameter, or characteristic of the lighting environment over which the system has control. For example, the controller could direct a window shade to open or close, or can direct an object within the lighting environment to move from one location to another location.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for measuring illumination by a lighting unit of a target surface within a lighting environment, the method comprising the steps of:

illuminating, with a light source of the lighting unit, the target surface;
   detecting, with a light sensor, a light intensity for a plurality of locations of the target surface;
   detecting a parameter of the lighting environment;
   detecting, using the detected parameter, an obstruction situated in the lighting environment between the light source and the target surface;
   selecting, by a controller of the lighting unit, a subset of the plurality of light intensities based on the detected parameter of the lighting environment and the detected obstruction, wherein the subset comprises light intensities from an unobstructed portion of the target surface; and
   estimating, using the selected subset of light intensities, a lux of the target surface.

2. The method of claim 1, wherein the parameter of the lighting environment is detected with a second sensor.

3. The method of claim 1, wherein the detected parameter is a distance between the light source and a reflecting surface.

4. The method of claim 1, wherein the detected parameter is a two-dimensional image of at least a portion of the lighting environment.

5. The method of claim 1, wherein the detected parameter is a three-dimensional image of at least a portion of the lighting environment.

6. The method of claim 1, further comprising the step of adjusting a parameter of the lighting unit based on the estimated lux of the target surface.

7. The method of claim 1, wherein the detected parameter is an occupant within the lighting environment, further wherein the controller is configured to select the subset of the plurality of light intensities based at least in part on information about the detected occupant.

8. The method of claim 1, wherein the detected parameter is a thermogram of at least a portion of the lighting environment.

9. A lighting unit configured to illuminate a target surface within a lighting environment, the lighting unit comprising:
   a light source;
   a light sensor configured to detect a light intensity for a plurality of locations of the target surface;
   a sensor configured to detect a parameter of the lighting environment;
   a sensor configured to detect, using the detected parameter, an obstruction situated in the lighting environment between the light source and the target surface; and
   a controller configured to select a subset of the plurality of light intensities based on the detected parameter of the lighting environment and the detected obstruction, wherein the subset comprises light intensities from an unobstructed portion of the target surface, and to determine, using the selected subset of light intensities, a lux of the target surface.

10. The lighting unit of claim 9, wherein the detected parameter is a distance between the light source and the target surface.

11. The lighting unit of claim 9, wherein the detected parameter is a three-dimensional image of at least a portion of the lighting environment.

12. The lighting unit of claim 9, wherein the controller is further configured to change a parameter of the lighting unit based on the estimated lux of the target surface.

13. A system configured to illuminate a target surface within a lighting environment, the system comprising:
   a lighting unit comprising a light source and a controller;

a light sensor configured to detect a light intensity for a plurality of locations of the target surface; and a sensor configured to detect a parameter of the lighting environment;

a sensor configured to detect, using the detected parameter, an obstruction situated in the lighting environment between the light source and the target surface;

wherein the controller is configured to select a subset of the plurality of light intensities based on the detected parameter of the lighting environment and the detected obstruction, wherein the subset comprises light intensities from an unobstructed portion of the target surface, and to estimate, using the selected subset of light intensities, a lux of the target surface.

14. The lighting system of claim 13, wherein the controller is further configured to change a parameter of the lighting unit based on the estimated lux of the target surface.

\* \* \* \* \*